US011548452B2

(12) United States Patent
Ha

(10) Patent No.: US 11,548,452 B2
(45) Date of Patent: Jan. 10, 2023

(54) METHOD AND DEVICE FOR CORRECTING VEHICLE VIEW CAMERAS

(71) Applicant: LG INNOTEK CO., LTD., Seoul (KR)

(72) Inventor: Ju Sung Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 208 days.

(21) Appl. No.: 16/767,814

(22) PCT Filed: Nov. 30, 2018

(86) PCT No.: PCT/KR2018/015050
§ 371 (c)(1),
(2) Date: May 28, 2020

(87) PCT Pub. No.: WO2019/108003
PCT Pub. Date: Jun. 6, 2019

(65) Prior Publication Data
US 2020/0298769 A1 Sep. 24, 2020

(30) Foreign Application Priority Data
Dec. 1, 2017 (KR) .......................... 10-2017-0163956

(51) Int. Cl.
*B60R 11/04* (2006.01)
*G06T 3/20* (2006.01)
(Continued)

(52) U.S. Cl.
CPC ................ *B60R 11/04* (2013.01); *B60R 1/00* (2013.01); *G06T 3/20* (2013.01); *G06T 3/60* (2013.01);
(Continued)

(58) Field of Classification Search
CPC ........ B60R 2300/402; B60R 2300/607; B60R 11/04; H04N 5/23229; H04N 17/002; G06T 7/80
See application file for complete search history.

(56) References Cited

U.S. PATENT DOCUMENTS 8,698,875 B2 * 4/2014 Anguelov .......... H04N 5/23238
348/148
9,386,302 B2 * 7/2016 Zeng ...................... G06V 10/42
(Continued)

FOREIGN PATENT DOCUMENTS

CN 113763480 A * 12/2021
CN 114202588 A * 3/2022
(Continued)

OTHER PUBLICATIONS

International Search Report in International Application No. PCT/KR2018/015050, dated Nov. 30, 2018.
(Continued)

Primary Examiner — John Villecco
(74) Attorney, Agent, or Firm — Saliwanchik, Lloyd & Eisenschenk

(57) ABSTRACT

A method for correcting a camera by using a plurality of pattern members placed on the ground of a vehicle enables receiving pattern information of a plurality of pattern members by using a plurality of cameras disposed on the circumference of a vehicle being driven, calculating a first parameter on the basis of the pattern information, calculating trajectory information of the vehicle by using the pattern information, and calculating a second parameter by correcting the first parameter on the basis of the trajectory information of the vehicle.

14 Claims, 8 Drawing Sheets

(51) Int. Cl.
  *G06T 3/60* (2006.01)
  *H04N 5/232* (2006.01)
  *G06T 7/80* (2017.01)
  *B60R 1/00* (2022.01)
  *G06V 10/24* (2022.01)
  *G06V 20/56* (2022.01)
  *H04N 17/00* (2006.01)

(52) U.S. Cl.
  CPC .............. *G06T 7/80* (2017.01); *G06V 10/245* (2022.01); *G06V 20/56* (2022.01); *H04N 5/23229* (2013.01); *B60R 2300/105* (2013.01); *B60R 2300/302* (2013.01); *B60R 2300/607* (2013.01); *G06T 2207/30252* (2013.01); *H04N 17/002* (2013.01)

(56) References Cited

U.S. PATENT DOCUMENTS

| | | | | |
|---|---|---|---|---|
| 9,661,319 | B2 * | 5/2017 | Zeng | H04N 17/002 |
| 9,688,200 | B2 * | 6/2017 | Knudsen | B60R 1/00 |
| 9,981,605 | B2 * | 5/2018 | Wang | H04N 5/247 |
| 9,986,173 | B2 * | 5/2018 | Wang | G06T 7/85 |
| 10,192,309 | B2 * | 1/2019 | Sakano | H04N 7/183 |
| 10,202,077 | B2 * | 2/2019 | Gupta | H04N 17/00 |
| 10,621,753 | B2 * | 4/2020 | Natroshvili | G06T 7/80 |
| 11,062,478 | B2 * | 7/2021 | Lasaruk | G06T 7/73 |
| 11,423,573 | B2 * | 8/2022 | Yuan | B60R 1/00 |
| 2012/0154586 | A1 * | 6/2012 | Chung | H04N 5/23238 348/148 |
| 2012/0287232 | A1 * | 11/2012 | Natroshvili | G06T 7/33 348/36 |
| 2013/0135474 | A1 * | 5/2013 | Sakano | G06T 7/80 348/148 |
| 2014/0085409 | A1 * | 3/2014 | Zhang | H04N 5/23238 348/36 |
| 2014/0247354 | A1 * | 9/2014 | Knudsen | G06T 7/85 348/148 |
| 2015/0049193 | A1 * | 2/2015 | Gupta | G06T 7/80 348/148 |
| 2015/0341628 | A1 | 11/2015 | Zeng et al. | |
| 2015/0341629 | A1 * | 11/2015 | Zeng | G06V 10/42 348/187 |
| 2016/0343136 | A1 * | 11/2016 | Heidi | G06T 7/80 |
| 2017/0277961 | A1 * | 9/2017 | Kuehnle | G06T 7/80 |
| 2017/0287168 | A1 | 10/2017 | Jeong et al. | |
| 2018/0365859 | A1 * | 12/2018 | Oba | G06T 7/85 |
| 2019/0213756 | A1 * | 7/2019 | Chang | B60R 1/00 |
| 2019/0295291 | A1 * | 9/2019 | Raag | G06T 7/70 |
| 2021/0387637 | A1 * | 12/2021 | Rogers | H04W 4/029 |
| 2022/0067973 | A1 * | 3/2022 | Lee | G06V 20/56 |
| 2022/0118994 | A1 * | 4/2022 | Lu | G06T 7/85 |

FOREIGN PATENT DOCUMENTS

| | | | | |
|---|---|---|---|---|
| DE | 102022000729 | A1 * | 4/2022 | |
| JP | 2013-129278 | A | 7/2013 | |
| KR | 10-1239740 | B1 | 3/2013 | |
| KR | 10-1402082 | B1 | 6/2014 | |
| KR | 20140090388 | A * | 7/2014 | |
| KR | 10-2015-0101806 | A | 9/2015 | |
| KR | 10-2017-0085752 | A | 7/2017 | |
| KR | 10-2017-0114105 | A | 10/2017 | |
| KR | 20220029820 | A * | 3/2022 | |
| WO | WO-2021121808 | A1 * | 6/2021 | ........... G01S 13/931 |

OTHER PUBLICATIONS

Office Action dated Feb. 26, 2022 in Korean Application No. 10-2017-0163956.

* cited by examiner

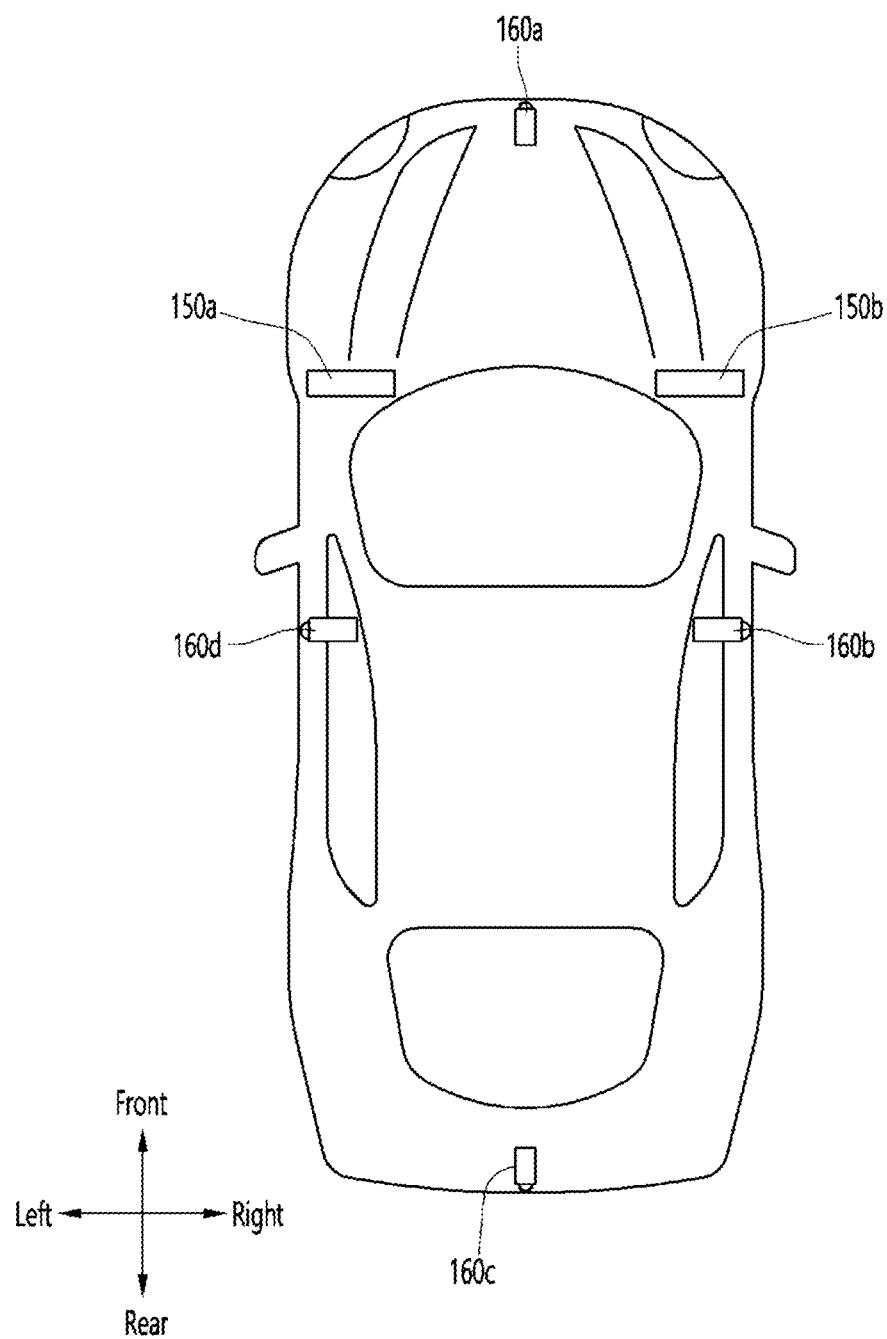

METHOD AND DEVICE FOR CORRECTING VEHICLE VIEW CAMERAS

CROSS-REFERENCE TO RELATED APPLICATIONS

This application is the U.S. national stage application of International Patent Application No. PCT/KR2018/015050, filed Nov. 30, 2018, which claims the benefit under 35 U.S.C. § 119 of Korean Application No. 10-2017-0163956, filed Dec. 1, 2017, the disclosures of each of which are incorporated herein by reference in their entirety.

TECHNICAL FIELD

Embodiments relate to a method and device for correcting a camera.

BACKGROUND ART

Vehicles are all devices that drive a wheel to be driven so as to transport people or cargo. A typical example of the vehicles is an automobile.

Vehicles may be classified into internal combustion engine vehicles, external combustion engine vehicles, gas turbine vehicles, and electric vehicles according to types of motors used for the vehicles.

An electric vehicle may be a vehicle that uses electricity as an energy source to drive an electric motor and may be classified into a pure electric vehicle, a hybrid electric vehicle (HEV), a plug-in hybrid electric vehicle (PHEV), and a hydrogen fuel cell vehicle (FCEV).

Recently, for the safety and convenience of drivers and pedestrians, development and commercialization of smart vehicles has been actively conducted. An intelligent vehicle is the most advanced vehicle in which information technology (IT) is converged and provides optimal transportation efficiency through interlocking with the intelligent transportation system as well as introduction of an advanced system of the vehicle itself. Specifically, the intelligent vehicle performs an automatic driving function, an adaptive cruise control (ACC), an obstacle detection, a collision detection, provision of a precise map, setting of a route to a destination, and provision of a position for a major place to maximize the safety and convenience of drivers, passengers and pedestrians.

As described above, an around view control device is drawing attention as one of devices for maximizing the safety and convenience of the drivers, passengers, and pedestrians.

The around view control device provides an around view image around the vehicle by using cameras, and the driver may view the surroundings of the vehicle in real time through the around view image.

Since the around view image is generated by synthesizing images of the cameras acquired in different directions, matching between the adjacent images is very important.

However, a vehicle manufactured by the vehicle manufacturer does not undergo camera correction, leading to a problem of mismatch between the adjacent images. The state in which the match is failed means mismatch.

As described above, when the match between the images is failed, a correction operation of the cameras is required.

DISCLOSURE OF THE INVENTION

Technical Problem

Objects of embodiments are to solve the above and other problems.

Another object of the embodiment is to provide a new method and device for correcting a camera.

Further another object of the embodiment is to provide a method and device for correcting a camera, which are capable of correcting the camera while a vehicle is manufactured by a vehicle manufacturer before being shipped.

Further another object of the embodiment is to provide a method and device for correcting a camera, which are capable of simply correcting the camera through driving.

Further another object of the embodiment is to provide a method and device for correcting a camera, which are capable of correcting a camera without a separate additional device.

Technical Solution

In order to achieve the above objects or other objects, according to an aspect of an embodiment, a method for correcting a camera by using a plurality of pattern members, the method includes: receiving pattern information of the plurality of pattern members by using a plurality of cameras disposed on a circumference of a vehicle being driven; calculating a first parameter based on the received pattern information; calculating trajectory information of the vehicle by using the pattern information; and calculating a second parameter by correcting the first parameter based on the trajectory information of the vehicle.

According to another aspect of an embodiment, a device for correcting a camera includes: a plurality of cameras disposed on a circumference of a vehicle; and a processor. The processor is configured to: receive pattern information of a plurality of pattern members, which are acquired by the plurality of cameras that are being driven along the ground on which the plurality of pattern member are disposed; calculate a first parameter based on the pattern information; calculate trajectory information of the vehicle based on the pattern information; and calculate a second parameter by correcting the first parameter based on the trajectory information of the vehicle.

Advantageous Effects

The effects of the method and device for correcting the camera according to the embodiments will be described below.

According to at least one of the embodiments, since the camera is corrected before the vehicle is shipped, the customer who receives the vehicle 700 may not need to perform the operation for separately correcting the camera, thereby greatly improving the customer service satisfaction. Since the camera is corrected under the same environment in the standardized field for correcting the camera, which is located in the vehicle manufacturer, there may be the advantage in that the customer complaints are minimized because the correction error between the vehicles in which the cameras are corrected in the vehicle manufacturer does not occur.

According to at least one of the embodiments, when the vehicle trajectory is deviated for the needs of the camera correction so as to correct the cameras, the first parameter may be corrected to calculate the second parameter, and the around view image may be generated or updated by using the second parameter. Therefore, there may be the advantage in that the misalignment at the interface between the adjacent images obtained from each camera is removed to improve the customer satisfaction because the around view image displayed on the screen is not disturbed to the driver.

The additional scope of the applicability of the embodiments will become apparent from the detailed description below. However, the various changes and modifications within the spirit and scope of the embodiments may be clearly understood by those skilled in the art, and thus, specific embodiments such as the detailed description and the preferred embodiments should be understood as given only as examples.

BRIEF DESCRIPTION OF THE DRAWINGS

FIG. 2b is a view illustrating a state in which a sensor unit included in the around view system is disposed in the vehicle according to an embodiment.

MODE FOR CARRYING OUT THE INVENTION

Figure 1:
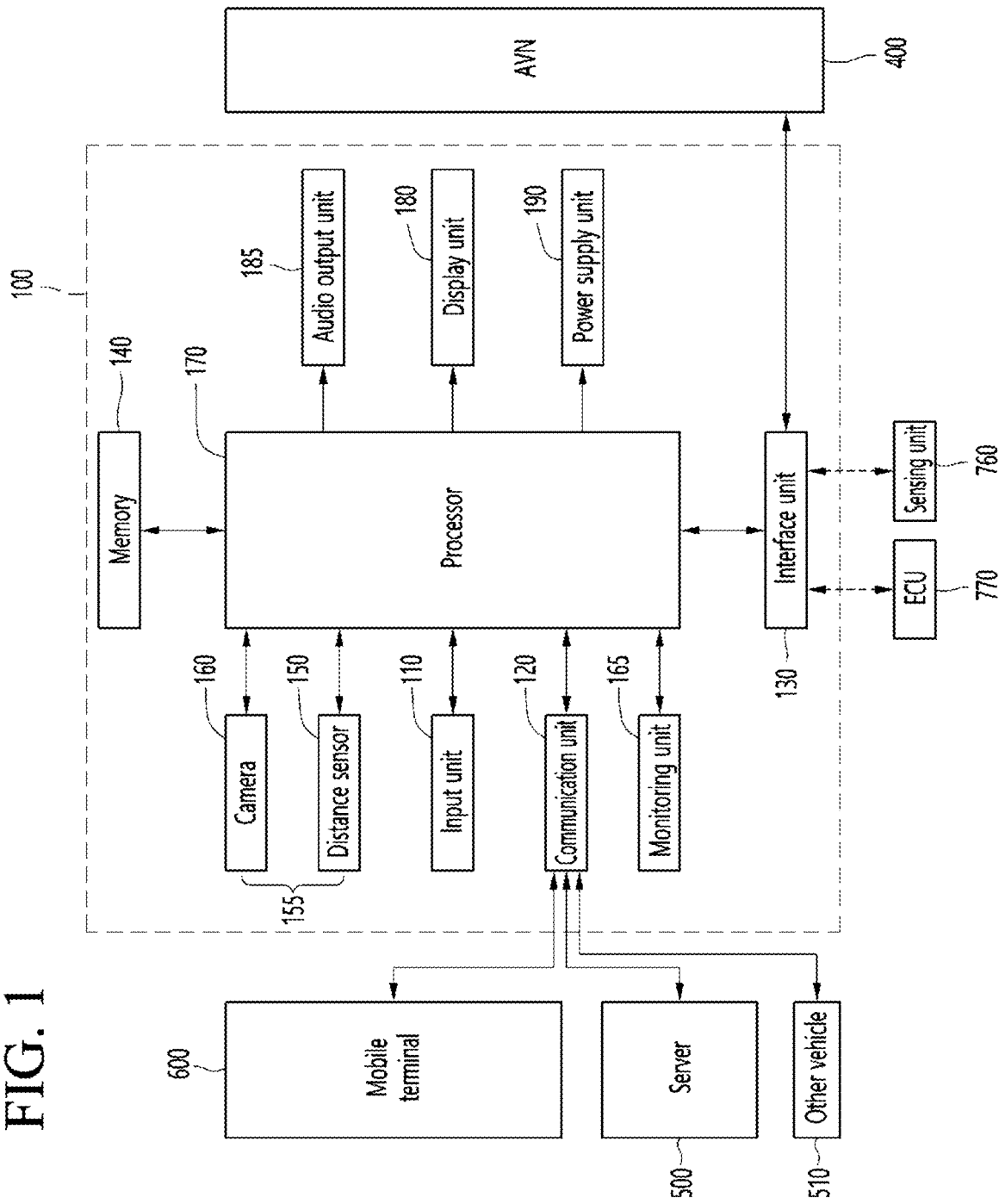
FIG. 1 is a block diagram illustrating a configuration of an around view system according to an embodiment.

Hereinafter, preferred embodiments of the present invention will be described below in more detail with reference to the accompanying drawings. However, the technical spirit of the present invention is not limited to some embodiments described, but may be implemented in various different forms, and within the technical spirit scope of the present invention, one or more of the components between the embodiments may be selectively coupled and substituted for the use. In addition, terms (including technical and scientific terms) used in the embodiments of the present invention, unless explicitly defined and described, can be generally understood by those skilled in the art to which the present invention pertains, and meanings of the terms, which are commonly used, such as predefined terms may be interpreted by considering the contextual meaning of the related technology. In addition, the terms used in the embodiments of the present invention are used only for explaining a specific exemplary embodiment while not limiting the present invention. In the present specification, a singular form may also include a plural form unless specifically stated in the phrase, and when described as "at least one (or more than one) of A, B, or C", a combination of A, B, and C can contain one or more of all possible combinations. In the description of the components of the present invention, the terms first, second, A, B, (a), and (b) may be used. Each of the terms is merely used to distinguish the corresponding component from other components, and does not delimit an essence, an order or a sequence of the corresponding component. In addition, when any component is described as being 'connected', 'coupled' or 'linked' to another component, not only the component is directly connected, coupled, or linked to the other component, but also to the component is 'connected', 'coupled' or 'linked' by another component between the other components. In addition, when described as being formed or disposed in the "upper (top) or below (bottom)" of each component, the upper (top) or below (bottom) is not only when the two components are in direct contact with each other, but also a case in which another component described above is formed or disposed between the two components. In addition, when expressed as "upper (top) or below (bottom)", it may include the meaning of the downward direction as well as the upward direction based on one component.

The vehicle described in this specification may include all types of vehicles such as automobiles and motorcycles. Hereinafter, a case of the vehicle will be described as an example.

In addition, the vehicle described in this specification may be a concept including all of an internal combustion engine vehicle including an engine as a power source, a hybrid vehicle including an engine and an electric motor as a power source, and an electric vehicle including an electric motor as a power source.

Hereinafter, a left side of the vehicle may denote a left side in a driving direction of the vehicle, and a right side of the vehicle may denote a right side in the driving direction of the vehicle. In the following description, unless otherwise stated, the vehicle means a left hand drive (LHD) vehicle in which the handle is located at the left side.

An around view system described in this specification is a separate device provided in a vehicle and is defined as a device that exchanges necessary information through data communication with the vehicle and provides an around view image for objects around the vehicle. The around view system may be mounted on the vehicle and shipped by the manufacturer or may be mounted by a driver or a third party after the vehicle is shipped.

However, according to an embodiment, the around view system may be provided as a set of some of the components of the vehicle to constitute a portion of the vehicle.

The around view image is an image showing the surroundings of the vehicle and may be referred to as a top view or a bird view. The around view image may be generated based on images acquired from different directions.

When the around view system is the separate device, at least some of the components of the around view system (see FIG. 1) may not be included in the around view system and be external components included in the vehicle or other devices mounted on the vehicle. It may be understood that these external components constitute the around view system by transmitting and receiving data through an interface of the around view system.

For convenience of description, it is described herein that the around view system directly includes each component illustrated in FIG. 1.

Hereinafter, an around view system according to an embodiment will be described in detail with reference to the accompanying drawings.

FIG. 1 is a block diagram illustrating a configuration of an around view system according to an embodiment.

Referring to FIG. 1, an around view system 100 may include a sensing unit 155 and a processor 170. Also, the around view system 100 according to the embodiment further includes at least one or more of an input unit 110, a communication unit 120, an interface unit 130, a memory 140, a monitoring unit 165, a display unit 180, an audio output unit 185, and a power supply unit 190. However, the components illustrated in FIG. 1 are not essential for implementing the around view system 100, and thus the around view system 100 according to the embodiment may have more or less components than those described above.

When each configuration is described in detail, the input unit 110 may sense a user's input. For example, the user may input setting for an around view image provided by the around view system 100 through the input unit 110 or may input execution such as turn on/off power of the around view system 100.

The input unit 110 may include at least one or more of a gesture input unit (e.g., optical sensor, etc.) that detects a user's gesture, a touch input unit (e.g., a touch sensor, a touch key, a mechanical key, etc.) that detects a touch, a microphone that detects a voice input to detect the user input.

The communication unit 120 may communicate with other vehicles 510, a mobile terminal 600, and a server 500.

In this case, the around view system 100 may receive at least one of navigation information, other vehicle driving information, or traffic information through the communication unit 120. Also, the around view system 100 may transmit information with respect to the vehicle provided with the corresponding around view system 100 through the communication unit 120.

Specifically, the communication unit 120 may receive at least one of position information, weather information, or road traffic situation information (e.g., transport protocol expert group (TPEG), etc.) from the mobile terminal 600 or/and the server 500.

Also, the communication unit 120 may receive the traffic information from the server 500 provided with an intelligent traffic system (ITS). Here, the traffic information may include traffic signal information, lane information, vehicle surrounding information, or position information.

The communication unit 120 may transmit navigation information to the mobile terminal 600 or/and the server 500. Here, the navigation information may include at least one or more of map information related to the vehicle driving, lane information, vehicle position information, set destination information, or route information according to a destination.

For example, the communication unit 120 may receive a real-time position of the vehicle through the navigation information. Specifically, the communication unit 120 may acquire a position of the vehicle including a global positioning system (GPS) module and/or a wireless fidelity (WiFi) module.

Also, the communication unit 120 may receive driving information of the other vehicle 510 from the other vehicle 510 and transmit the information of the own vehicle to the other vehicle 510 to share the driving information between the vehicles. Here, the driving information shared with each other may include at least one or more of information about a vehicle moving direction, position information, vehicle speed information, acceleration information, moving route information, forward/reverse information, adjacent vehicle information, or turn signal information.

Also, when the user is boarded on the vehicle, the user's mobile terminal 600 and the around view system 100 may perform pairing with each other automatically or by executing the user's application.

The communication unit 120 may exchange data with other vehicles 510, the mobile terminal 600, or the server 500 in a wireless manner.

In detail, the communication unit 120 may perform wireless communication using a wireless data communication method. As the wireless data communication method, technical standards or communication methods for mobile communication (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like) may be used.

In addition, the communication unit 120 may use wireless Internet technologies, for example, wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

Also, the communication unit 120 may use short range communication, for example, may support short range communication by using at least one of Bluetooth (Bluetooth™), radio frequency Identification (RFID), infrared data association (IrDA), ultra-wideband (UWB), ZigBee, near field communication (NFC), wireless-fidelity (Wi-Fi), Wi-Fi direct, wireless universal serial bus (Wireless USB), or the like.

Also, the around view system 100 uses a short range communication method to pair with the mobile terminal 600 inside the vehicle and uses a long range wireless communication module of the mobile terminal 600 to wirelessly exchange data with another vehicle 510 or server.

The interface unit 130 may receive data from an electronic control unit (ECU) 770 that controls the vehicle as a whole or transmits a signal processed or generated by the processor 170 to the outside to execute an interface between the inside and the outside of the around view system 100.

Specifically, the around view system 100 may receive at least one of the vehicle driving information, the navigation information, or the sensing information through the interface unit 130.

Also, the around view system 100 may transmit a control signal for executing around view or information generated by the around view system 100 to the ECU 770 of the vehicle through the interface unit 130.

For this, the interface unit 130 may perform data communication with at least one of the ECU 770, the audio video navigation (AVN) device 400, or the sensing unit 760 inside the vehicle in a wired or wireless communication manner.

Specifically, the interface unit 130 may receive the navigation information by data communication with the ECU 770, the AVN device 400, and/or a separate navigation device (not shown).

Also, the interface unit 130 may receive the sensing information from the ECU 770 or the sensing unit 760.

Here, the sensing information may include at least one or more of direction information, position information, vehicle speed information, acceleration information, tilt information, forward/reverse information, fuel information, distance information between the front and rear vehicles, distance between the vehicle and the lane, or turn signal information.

Also, the sensor information may be obtained from a heading sensor, a yaw sensor, a gyro sensor, a position module, a vehicle forward/reverse sensor, a wheel sensor, a vehicle speed sensor, a body tilt detection sensor, a battery sensor, a fuel sensor, a tire sensor, a steering sensor by rotation of a steering wheel, a vehicle interior temperature sensor, a vehicle interior humidity sensor, a door sensor, and the like. The position module may include a GPS module for receiving GPS information.

The interface unit 130 may receive the user input received through the user input unit 724 of the vehicle. In this case, the interface unit 130 may receive the user input directly from the vehicle input unit 724 of the vehicle or through the ECU 770 of the vehicle.

Also, the interface unit 130 may receive the traffic information obtained from the server 500. The server 500 may be a server located in a traffic control center that controls traffic. For example, when traffic information is received from the server 500 through the communication unit 710 of the vehicle, the interface unit 130 may receive the traffic information from the ECU 770 of the vehicle.

The memory 140 may store various data for an overall operation of the around view system 100 such as program for processing or controlling the processor 170.

Also, the memory 140 may store a plurality of application programs or applications that are driven in the around view system 100, data for operating the mobile terminal 100, and commands. At least a portion of the application programs may be downloaded from an external server through wireless communication. Also, at least a portion of these application programs may exist in the around view system 100 from the time of shipment for basic functions (for example, a vehicle surrounding guidance function) of the around view system 100.

The application program may be stored in the memory 140 and driven by the processor 170 to perform an operation (or function) of the around view system 100.

The memory 140 may store data for identifying an object included in an image. For example, when a predetermined object is detected in the vehicle surrounding image acquired through the camera 160, the memory 140 may store data for identifying what the object corresponds by various algorithms.

For example, the memory 140 may store comparison images and comparison data to determine whether the object included in the image obtained through the camera 160 corresponds to an object such as a lane, a traffic sign, a two-wheeled vehicle, or a pedestrian.

Also, the memory 140 may store preset synthesis information or viewpoint information used to generate the around view image.

The around view image may be generated by combining images obtained from different directions. Here, range information and boundary information of the synthesis region generated from each image may be stored in the memory 140 as synthesis information.

The viewpoint information may be information about a direction viewed from a view point of the camera, but is not limited thereto.

In hardware-wise, the memory 140 may include at least one type of storage medium of a, flash memory type, a hard disk type, a solid state disk type, a silicon disk drive type (SDD type), a multimedia card micro type, a card type memory (e.g., SD or XD memory), a random access memory (RAM), a static random access memory (SRAM), a read-only memory (ROM), an electrically erasable programmable read memory, a programmable read-only memory (PROM), a magnetic memory, a magnetic disk, or an optical disk.

Also, the around view system 100 may operate with respect to a web storage, which performs the functions of the memory 140 on the Internet.

The monitoring unit 165 may acquire information about the situation inside the vehicle.

The information detected by the motoring unit 165 may include at least one or more of facial recognition information, fingerprint information, iris-scan information, retina-scan information, hand geo-metry information, or voice recognition information. Also, the monitoring unit 165 may include other sensors that detect such biometric information.

The around view system 100 may further include a sensing unit 155 that detects objects around the vehicle. According to an embodiment, the around view system 100 may receive the sensing information obtained from the sensing unit 760 of the vehicle through the interface unit 130. The sensing information obtained as described above may be included in the vehicle surrounding information.

The sensing unit 155 may include at least one of the distance sensor 150 that detects the position of an object around the vehicle or the camera 160 that captures an image around the vehicle.

The distance sensor 150 may accurately detect a position of an object adjacent to the vehicle, a direction from which the object is spaced apart, a separation distance, or a moving direction of the object. The distance sensor 150 may continuously measure the position from the detected object to accurately detect a change in positional relationship with the own vehicle.

The distance sensor 150 may detect an object disposed in at least one region of front and rear sides and left and right sides of the vehicle. For this, the distance sensor 150 may be disposed at various positions of the vehicle.

The distance sensor 150 may include at least one or more of various sensors, which is capable of measuring a distance, such as a lidar sensor, a laser sensor, an ultrasonic waves sensor, and a stereo camera.

For example, the distance sensor 150 may be the laser sensor and use a time-of-flight (TOF) or/and phase-shift method according to a laser signal modulation method to accurately measure the positional relationship between the own vehicle and the object.

The information about the object may be obtained by analyzing the image, which is captured by the camera 160, by the processor 170. Specifically, the around view system 100 may capture the vehicle surroundings using the camera 160, the processor 170 may analyze the acquired vehicle surrounding image to detect an object around the vehicle and determine properties of the object, thereby generating sensing information.

Here, the object information may be at least one of a kind of the object, traffic signal information displayed by the object, a distance between the object and the vehicle, or a position of the object and included in the sensing information.

Specifically, the processor 170 may generate image information by detecting the object in the image captured through image processing, tracking the object, measuring a distance from the object, and identifying the object to perform object analysis.

Although not shown, the sensing unit 155 may further include an ultrasonic sensor. The ultrasonic sensor may include a plurality of ultrasonic sensors, but is not limited thereto. Objects around the vehicle may be detected based on a difference between ultrasonic waves transmitted from each of the ultrasonic sensors and ultrasonic waves transmitted and reflected by the objects.

The processor 170 may synthesize an image captured in all directions to provide an around view image of the vehicle, which is viewed from above.

In order to allow the processor 170 to perform the object analysis more easily, the camera 160 in an embodiment may be a stereo camera that measures a distance from an object while capturing an image.

The camera 160 may directly include an image sensor and an image processing module. In this case, the camera 160 may process a still image or a moving image that is obtained by an image sensor (e.g., CMOS or CCD). Also, the image processing module may process the still image or the moving image that is acquired through the image sensor to extract necessary image information and then transmit the extracted image information to the processor 170.

The sensing unit 155 may be a stereo camera in which the distance sensor 150 and the camera 160 are combined with each other. That is, the stereo camera may acquire an image and sense the positional relationship with the object.

The display unit 180 may display the around view image. The display unit 180 may include at least one or more display areas as necessary. Different image information may be displayed on the display areas, respectively.

The audio output unit 185 may output a message, which confirms the description of the around view image, whether it is executed, or the like, as an audio. Thus, the around view system 100 may complement the description of the functions of the around view system 100 with respect to each other through the sound of the audio output unit 185 together with the visual display through the display unit 180.

According to an embodiment, the around view system 100 may further include a haptic output unit (not shown) that outputs a haptic signal. The haptic output unit (not shown) may output an alarm for the around view image as a haptic. For example, when warning for the driver is included in at least one information of the navigation information, the traffic information, the communication information, the vehicle status information, driving assistance function (ADAS) information, and other driver convenience information, the around view system 100 may inform the warning to the user through vibration.

The haptic output unit (not shown) may provide vibration having directionality. For example, the haptic output unit (not shown) may be disposed on a steering controlling steering to output vibration, and when the vibration is provided, the steering are divided into a left side and a right side to output the vibration, thereby providing the directionality of the haptic output.

The power supply unit 190 may receive external power and internal power to supply power required for operating each of components by the control of the processor 170.

The processor 170 may control an overall operation of each of the components within the around view system 100.

Also, the processor 170 may control at least a portion of the components included in the around view system 100 or operate at least two or more of the components in combination with each other to drive the application program.

In hardware-wise, the processor 170 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors 170, and electrical units for performing other functions.

According to an embodiment, the processor 170 may be controlled by the ECU 770 of the vehicle.

In addition to the operation related to the application program stored in the memory 140, the processor 170 generally controls the overall operation of the around view system 100. The processor 170 may process signals, data, or information which are inputted or outputted through the above-described constituents or drive the application program stored in the memory 170 to provide or process information or functions suitable for the user.

Figure 2A:
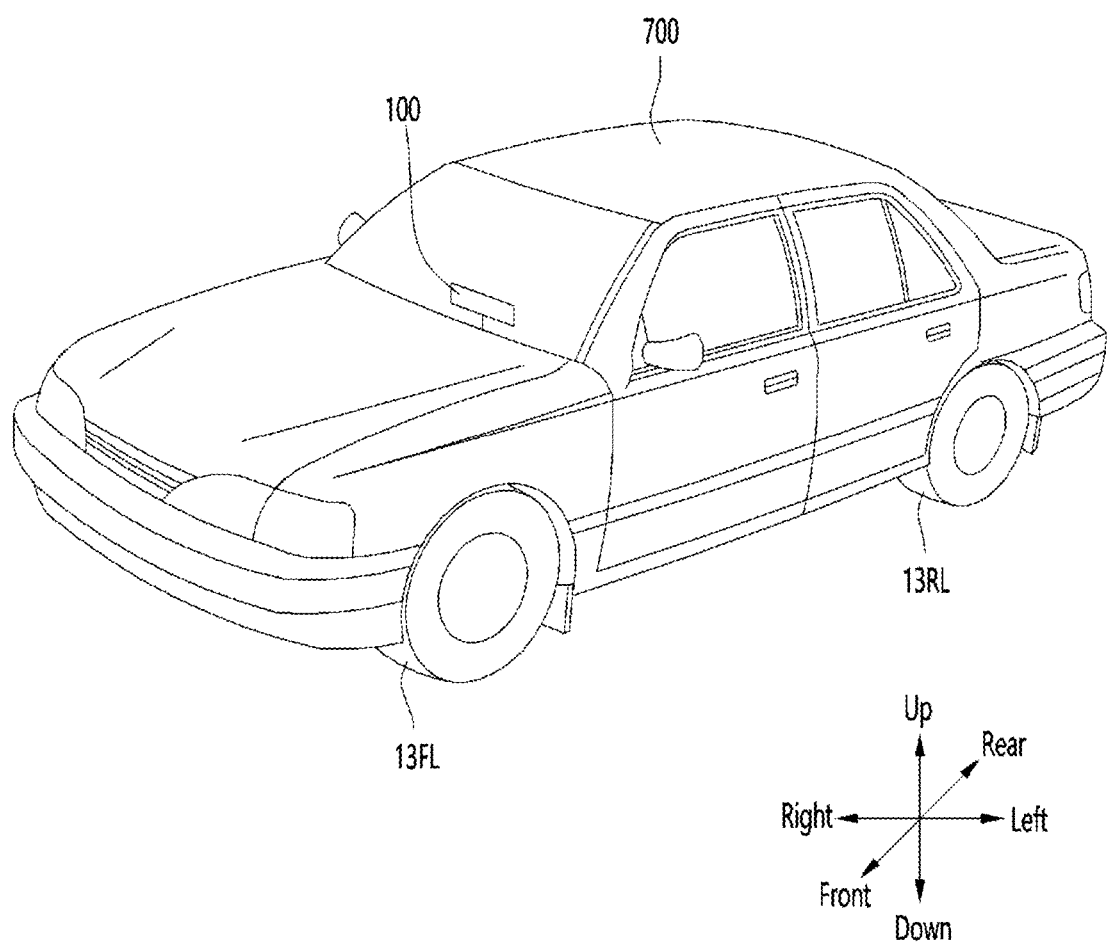
FIG. 2a is a view illustrating an outer appearance of a vehicle provided with the around view system according to an embodiment.

FIG. 2a is a view illustrating an outer appearance of the vehicle provided with the around view system according to an embodiment.

Referring to FIG. 2a, a vehicle 700 according to an embodiment includes wheels 13FL and 13RL that rotate by a power source and an around view system 100 that provides object information about the vehicle to a user.

The around view system 100 may be installed inside the vehicle 700. In this case, an installation position of the around view system 100 may be variously set according to embodiments. Referring to FIG. 2a, the around view system 100 is disposed under a front window 100 of the vehicle 700.

FIG. 2b is a view illustrating a state in which the sensor unit included in the around view system is disposed in the vehicle according to an embodiment.

The distance sensor 150 included in the sensing unit 155 may be disposed at least one position of front and rear sides, left and right sides, and a ceiling of a vehicle body. Referring to FIG. 2b, distance sensors 150a and 150b are disposed on the left and right sides of the vehicle, respectively.

The camera 160 included in the sensing unit 155 may be provided at various positions to monitor the front and rear side and the left and right sides in the driving direction. Referring to FIG. 2b, cameras 160a, 160b, 160c, and 160d are disposed on the front, rear, left, and right sides of the vehicle, respectively.

For example, the camera 160a installed at the front side is called a first camera, the camera 160b installed at the right side is called a second camera, the camera 160c installed at the rear side is called a third camera, and the camera 160d installed at the left side is called a fourth camera, but is not limited thereto. The firstly mentioned camera among the plurality of cameras 160a, 160b, 160c, and 160d may be called the first camera, and the next camera may be called the second camera.

The first camera 160a may acquire a front image by capturing the front side in the driving direction. For this, the first camera 160a may be disposed near an emblem or near a radiator grill.

The second camera 160b may be disposed in a case surrounding a right side mirror. According to an embodiment, the second camera 160b may be disposed outside the case surrounding the right side mirror or may be disposed on one area outside a right front door, a right rear door, or a right fender.

The third camera 160c may acquire a rear image by capturing the rear side of the driving direction. As described above, the third camera 160c may be disposed near a rear license plate or a trunk switch.

The fourth camera 160d may be disposed in a case surrounding a left side mirror. According to an embodiment, the fourth camera 160d may be disposed outside the case surrounding the left side mirror or may be disposed in an area outside a left front door, a left rear door, or a left fender.

Although not shown, an additional camera may be installed on the ceiling of the vehicle. The ceiling camera may capture both front and rear and left and right directions of the vehicle.

Furthermore, additional cameras may be further installed in addition to the first to fourth cameras 160a, 160b, 160c, and 160d as necessary.

Figure 3:
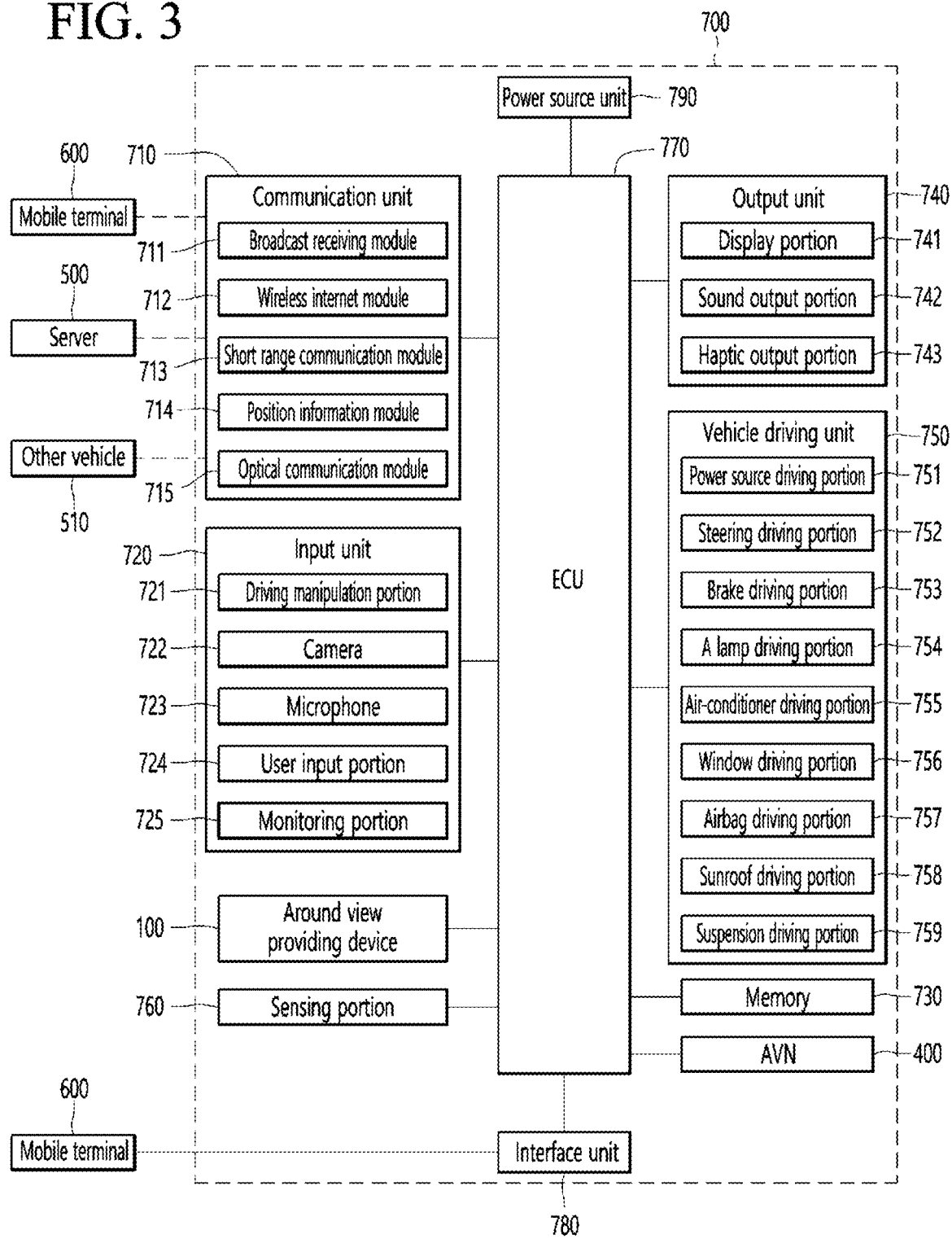
FIG. 3 is a block diagram illustrating a configuration of the vehicle including the around view system according to an embodiment.

FIG. 3 is a block diagram illustrating a configuration of the vehicle including the around view system according to an embodiment.

The around view system 100 according to an embodiment may be installed in the vehicle 700.

Referring to FIG. 3, the vehicle 700 may include a communication unit 710, an input unit 720, a sensing unit 760, an output unit 740, a vehicle driving unit 750, a memory 730, an AVN device 400, an interface unit 780, an ECU 770, a power source unit 790, and an around view system 100.

The communication unit 710 may include one or more modules that facilitate wireless communication between the vehicle 700 and a mobile terminal 600, between the vehicle 700 and a server 510, or between the vehicle 700 and another vehicle 510. Also, the communication unit 710 may include one or more module connecting the vehicle 700 to one or more networks.

The communication unit 710 may include a broadcast receiving module 711, a wireless Internet module 712, a short range communication module 713, a position information module 714, and an optical communication module 715.

The broadcast receiving module 711 receives a broadcast signal or broadcast-related information from an external broadcast management server through a broadcast channel. Here, the broadcast includes radio broadcast or TV broadcast.

The wireless Internet module 712 may be a module for wireless Internet access. The wireless Internet module 303 may be embedded in the vehicle 700 or installed in an external device. The wireless Internet module 712 may transmit and receive a wireless signal in a communications network based on wireless Internet technologies.

For example, examples of the wireless Internet technologies may include wireless LAN (WLAN), wireless fidelity (Wi-Fi), Wi-Fi direct, digital living network alliance (DLNA), wireless broadband (WiBro), worldwide interoperability for microwave access (WiMAX), high speed downlink packet access (HSDPA), high speed uplink packet access (HSUPA), long term evolution (LTE), long term evolution-advanced (LTE-A), and the like. The wireless Internet module 712 may transmit and receive data according to at least one of the foregoing wireless Internet technologies and other Internet technologies as well. For example, the wireless Internet module 712 may wirelessly exchange data with the external server 500. The wireless Internet module 712 may receive weather information, traffic condition information of a road (e.g., transport protocol expert group (TPEG) information) from the external server 500.

The short range communication module 713 may be configured to facilitate short range communication. The short range communication module 305 may support short range communication by using at least one of Bluetooth (Bluetooth™), radio frequency Identification (RFID), infrared data association (IrDA), ultra-wideband (UWB), Zig-Bee, near field communication (NFC), wireless-fidelity (Wi-Fi), Wi-Fi direct, wireless universal serial bus (Wireless USB), and the like.

The short range communication module 713 may form wireless area networks to perform short range communication between the vehicle and at least one external device. For example, the short range communication module 713 may wirelessly exchange data with the mobile terminal 600. The short range communication module 713 may receive weather information, traffic condition information of a road (e.g., transport protocol expert group (TPEG) information) from the mobile terminal 600. For example, when the user rides in the vehicle, the mobile terminal 600 and the vehicle of the user may be executed automatically or executed by user's application to perform fairing therebetween.

The position information module 714 may be a module for acquiring a position of the vehicle. There is a global positioning system (GPS) as a representative example of the position information module 307. For example, the vehicle 700 may acquire a position of the vehicle 700 based on a signal transmitted from a GPS satellite using a GPS module.

The optical communication module 715 may include a light emitting portion and a light receiving portion.

The light receiving portion may convert a light signal into an electrical signal to receive information. The light receiving portion may include a photo diode PD for receiving light. The photo diode may convert light into an electrical signal. For example, the light receiving portion may receive information of a front vehicle through light emitted from a light source provided in the front vehicle.

The light emitting portion may include at least one or more light emitting elements for converting an electrical signal into a light signal. Here, a light emitting diode (LED) may be provided as the light emitting element. The light emitting portion may convert an electrical signal into a light signal to emit the converted light signal to the outside. For example, the light emitting portion may emit the light signal to the outside through flickering of the light emitting element corresponding to a predetermined frequency. According to an embodiment, the light emitting portion may include a plurality of light emitting element arrays. According to an embodiment, the light emitting portion may be integrated with a lamp provided in the vehicle. For example, the light emitting portion may be at least one of a headlamp, a taillight, a stop lamp, a turn signal, and a sidelight.

According to an embodiment, the optical communication module 715 may exchange data with another vehicle 510 through optical communication.

The input unit 720 may include a driving manipulation portion 721, a camera 722, a microphone 723, a user input portion 725, and a monitoring portion 725.

The driving manipulation portion 721 receives a user input for driving the vehicle. The driving manipulation portion 721 may include a steering input portion, a shift input portion, an acceleration input portion, and a brake input portion.

The steering input portion may receive an input for a driving direction of the vehicle 700. The steering input portion is preferably formed in the form of a wheel to enable a steering input by rotation. According to an embodiment, the steering input portion may be formed as a touch screen, a touch pad, or a button.

The shift input portion receives inputs for parking (P), forward (D), neutral (N), and reverse (R) of the vehicle. The shift input portion is preferably formed in the form of a lever. The shift input portion may be formed as a touch screen, a touch pad, or a button.

The acceleration input portion receives an input for acceleration of the vehicle. The brake input portion receives an input for deceleration of the vehicle from the user. In this case, each of the acceleration input portion and the brake input portion are preferably formed in the form of a pedal. According to an embodiment, the acceleration input portion or the brake input portion may be formed as a touch screen, a touch pad, or a button.

The camera 722 may include an image sensor and an image processing module. The camera 722 may process a still image or a moving image that is obtained by an image sensor (e.g., a CMOS or CCD). The image processing module may process the still image or the moving image that is acquired through the image sensor to extract necessary information and then transmit the extracted information to the ECU 770. The vehicle 700 may include a camera 722 for capturing a vehicle front image or a vehicle surrounding image and a monitoring portion 725 for capturing an interior image of the vehicle.

The monitoring portion 725 may acquire an image of the passenger. The monitoring portion 725 may acquire an image for biometrics of the passenger.

In FIG. 3, although the monitoring portion 725 and the camera 722 are included in the input unit 720, the camera 722 may be described as a configuration included in the around view system 100 as described above.

The microphone 723 may process an external sound signal into electrical data. The processed data may be variously utilized according to functions that are being performed in the vehicle 700. The microphone 723 may convert a user's voice command into electrical data. The converted electrical data may be transmitted to the ECU 770.

The user input portion 724 may receive information from the user. When information is inputted through the user input portion 724, the ECU 770 may control an operation of the vehicle 700 to correspond to the inputted information. The user input portion 724 may include a touch type input portion or a mechanical input portion. According to an embodiment, the user input portion 724 may be disposed on one area of a stirring wheel. In this case, the driver may manipulate the user input portion 724 by using a finger thereof in a state in which the driver holds the stirring wheel.

The sensing unit 760 senses a signal related to driving of the vehicle. For this, the sensing unit 760 may include a crash sensor, a wheel sensor, a speed sensor, a tilt sensor, a weight sensor, a heading sensor, a yaw sensor, a gyro sensor, a position module, a vehicle forward movement/backward movement sensor, a battery sensor, a fuel sensor, a tire sensor, a steering sensor by rotation of a handle, an in-vehicle temperature sensor, an in-vehicle humidity sensor, an ultrasonic sensor, a radar, a lidar, and the like.

Thus, the sensing unit 760 may acquire sensing signals with respect to vehicle crush information, vehicle direction information, vehicle position information (GPS information), vehicle angle information, vehicle speed information, vertical acceleration information, vehicle tilt information, vehicle forward movement/backward movement information, battery information, fuel information, tire information, vehicle lamp information, in-vehicle temperature information, in-vehicle humidity information, a steering wheel rotation angle, and the like.

The sensing unit 760 may further include an acceleration pedal sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The sensing unit 760 may include a biometric information detection portion. The biometric information detection portion detects and acquires biometric information of a passenger. The biometric information may include fingerprint information, iris-scan information, retina-scan information, hand geo-metry information, facial recognition information, and voice recognition information. The biometric information sensing portion may include a sensor for sensing the biometric information of the passenger. Each of the monitoring portion 725 and the microphone 723 may operate as a sensor. The biometric information sensing portion may acquire the hand geo-metry information and the facial recognition information through the monitoring portion 725.

The output unit 740 may be configured to output information processed in the ECU 770 and include a display portion 741, a sound output portion 742, and a haptic output portion 743.

The display portion 741 may display information processed in the ECU 770. For example, the display portion 741 may display vehicle-related information. Here, the vehicle-related information may include vehicle control information for direct control of the vehicle or vehicle driving assistance information for driving guidance to the vehicle driver. Also, the vehicle-related information may include vehicle condition information for informing conditions of the present vehicle or vehicle driving information related to the driving of the vehicle.

The display portion 741 may be the display unit 180 of the around view system 100 or may be provided separately.

The display portion 741 may be implemented by at least one of a liquid crystal display (LCD), a thin film transistor-liquid crystal display (TFT LCD), an organic light-emitting diode (OLED), a flexible display, a 3D display, and an E-ink display.

The display portion 741 may be formed with a mutual layer structure with a touch sensor or formed integrally, so that a touch screen may be implemented. The touch screen may serve as a user input portion 724 that provides an input interface between the vehicle 700 and the user and also provide an output interface between the vehicle 700 and the user. In this case, the display portion 741 may include the touch sensor for sensing touch on the display portion 741 to receive a control command in a touch manner. Thus, when the touch is performed on the display portion 741, the touch sensor may sense the touch, and the ECU 770 may be configured to generate a control command corresponding to the touch according to the touch on the display portion 601. Contents inputted by the touch manner may include characters or figures or menu items that are capable of being indicated or designated in various modes.

The display portion 741 may include a cluster to allow the driver to confirm the vehicle condition information or the vehicle driving information just when the driver drives the vehicle. The cluster may be disposed on a dashboard. In this case, the driver may confirm information displayed on the cluster in a state in which the driver maintains his sight to the front side.

According to an embodiment, the display portion 741 may be realized by using a head up display (HUD). When the display portion 741 is realized by using the HUD, information may be outputted through the transparent display provided on the windshield. Alternatively, the display portion 741 may output information through an image that is projected on the windshield by providing a projection module.

The sound output portion 742 may convert an electrical signal transmitted from the ECU 770 into an audio signal and then output the converted audio signal. For this, the sound output portion 742 may include a speaker. The sound output portion 742 may output a sound corresponding an operation of the user input portion 724.

The haptic output portion 743 generates a tactile output. For example, the haptic output portion 743 may operate to oscillate a steering wheel, a safety belt, and a sheet, thereby allowing the user to recognize the output.

The vehicle driving unit 750 may control operations of various devices and components included in the vehicle 700. The vehicle driving unit 750 may include a power source driving portion 751, a steering driving portion 752, a brake driving portion 753, a lamp driving portion 754, an air-conditioner driving portion 755, a window driving portion 756, an airbag driving portion 757, a sunroof driving portion 758, and a suspension driving portion 759.

The power source driving portion 751 may perform an electronic control with respect to a power source within the vehicle 700.

For example, when a fossil fuel-based engine (not shown) is provided as a power source, the power source driving portion 751 may perform electronic control of the engine. Thus, output torque of the engine may be controlled. When the power source driving portion 751 is an engine, a speed of the vehicle may be limited by limiting the engine output torque under the control of the ECU 770.

For another example, when the electric motor (not shown) is a power source, the power source driving portion 751 may control the motor. Thus, the rotational speed, torque and the like of the motor may be controlled.

The steering driving portion 752 may perform an electronic control with respect to a steering apparatus within the vehicle. Thus, the heading direction of the vehicle may be changed.

The brake driving portion 753 may perform an electronic control with respect to a brake apparatus (not shown) within the vehicle. For example, the brake driving portion 705 may control an operation of the brake disposed on the wheel to reduce a speed of the vehicle. For another example, the brake driving portion 705 may differently control operations of the brakes respectively disposed on left and right wheels to adjust the heading direction of the vehicle to a left or right direction.

The lamp driving portion 754 may control a turn on/turn off of a lamp disposed inside and outside the vehicle. Also, the lamp driving portion 707 may control light intensity and direction of the lamp. For example, the lamp driving portion 707 may perform a control of each of a turn signal lamp and a brake lamp.

The air-conditioner driving portion 755 may perform an electronic control with respect to an air conditioner (not shown) within the vehicle. For example, if an inner temperature of the vehicle is high, the air conditioner may operate to control supply of cool air into the vehicle 700.

The window driving portion 756 may perform an electronic control with respect to a window apparatus within the vehicle. For example, the window driving portion may control an opening or closing of each of left and right windows disposed on side surfaces of the vehicle 700.

The airbag driving portion 757 may perform an electronic control with respect to an airbag apparatus within the vehicle. For example, the airbag driving portion 713 may control so that an airbag is inflated in emergency.

The sunroof driving portion 758 may perform an electronic control with respect to a sunroof apparatus (not shown) within the vehicle. For example, the sunroof driving portion 715 may control an opening or closing of a sunroof.

The suspension driving portion 759 may perform an electronic control with respect to a suspension apparatus (not shown) within the vehicle 700. For example, when a curved road exists, the suspension driving portion controls the suspension apparatus to reduce vibration of the vehicle.

The memory 730 is electrically connected to the ECU 770. The memory 730 may store basic data for the unit, control data for controlling the operation of the unit, and input/output data. The memory 730 may be various storage media such as a ROM, a RAM, an EPROM, a flash drive, a hard drive, and the like, in hardware-wise. The memory 730 may store various data for an overall operation of the vehicle such as program for processing or controlling the ECU 770.

The interface unit 780 may serve as a passage for various kinds of external devices connected to the vehicle 700. For example, the interface unit 780 may include a port that is connectible to the mobile terminal 600 and be connected to the mobile terminal 600 through the port. In this case, the interface unit 780 may exchange data with the mobile terminal 600.

The interface unit 780 may serve as a passage for supplying electric energy to the mobile terminal 600 connected thereto. When the mobile terminal 600 is electrically connected to the interface unit 780, the interface unit 780 provides the electric energy supplied from the power source unit 790 to the mobile terminal 600 under the control of the ECU 770.

The ECU 770 may control an overall operation of each of the components within the vehicle 700. The ECU 770 may be called an electronic control unit (ECU).

The ECU 770 may execute a function corresponding to the transmitted signal according to execution signal transmission of the around view system 100.

The ECU 770 may be implemented in the form of at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

Here, the controller or the microprocessor may be devices that are separated from the processor 170 included in the around view system 100.

The power source unit 790 may supply power required for operating each of components under the control of the ECU 770. Particularly, the power source unit 790 may receive power from a battery (not shown) provided in the vehicle.

The AVN device 400 may exchange data with the ECU 770. The ECU 770 may receive navigation information from the AVN device 400 or a separate navigation device (not shown). Here, the navigation information may include set destination information, route information according to the destination, map information or vehicle position information related to driving of the vehicle.

Figure 4:
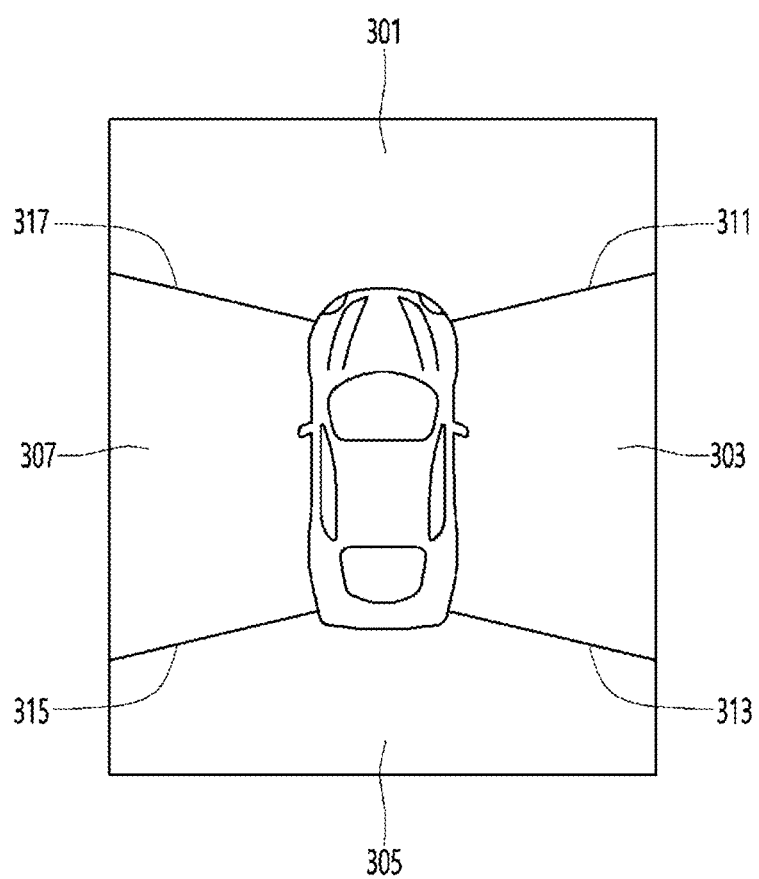
FIG. 4 is a view illustrating an around view image.

FIG. 4 is a view illustrating an around view image.

Referring to FIG. 4, an around view image may include first to fourth synthesis regions 301, 303, 305, and 307. The around view image may be displayed on the display unit 180.

The first synthesis region 301 may be generated based on the front image obtained by the first camera 160a installed at the front side of the vehicle 700. The second synthesis region 303 may be generated based on the left image obtained by the second camera 160b installed at the right side of the vehicle 700. The third synthesis region 305 may be generated based on the rear image obtained by the third camera 160c installed at the rear of the vehicle 700. The fourth synthesis region 307 may be generated based on the left image obtained by the fourth camera 160d installed at the left side of the vehicle 700.

The images of each of the synthesis regions 301, 303, 305, and 307 may be different from images obtained from the first to fourth cameras 160a, 160b, 160c, and 160d.

That is, the images obtained from the first to fourth cameras 160a, 160b, 160c, and 160d are images incident through lenses of the camera 160a, 160b, 160c, and 160d, and thus, an actual shape of the object may be displayed as it is as an image. On the other hand, the image of each of the synthesis regions 301, 303, 305, and 307 may be an image in which the front view of the image obtained from each of the first to fourth cameras 160a, 160b, 160c, and 160d is changed to a top view.

For example, if an object having an image obtained from a specific camera among the first to fourth cameras 160a, 160b, 160c, and 160d is a standing person, the person who is an object in the synthesis region generated from the acquired image does not stand, but it may look as if the person is lying down.

The first to fourth synthesis regions 301, 303, 305, and 307 may be disposed adjacent to each other with respect to boundary lines 311, 313, 315, and 317. For example, the first synthesis region 301 and the second synthesis region 303 may be disposed adjacent to each other with respect to the first boundary line 311. The second synthesis region 303 and the third synthesis region 305 may be disposed adjacent to each other with respect to the second boundary line 313. The third synthesis region 305 and the fourth synthesis region 307 may be disposed adjacent to each other with respect to the third boundary line 315. The fourth synthesis region 307 and the first synthesis region 301 may be disposed adjacent to each other with respect to the fourth boundary line 317.

The around view image may be generated based on the synthesis information stored in the memory 140. As described above, the synthesis information may include range information of the first to fourth synthesis regions 307 generated from the images obtained by the first to fourth cameras 160a, 160b, 160c, and 160d and boundary information with respect to the boundaries between the first to fourth synthesis information and may be stored in the memory 140.

The boundary information may be set to positions of the first to fourth boundary lines 311, 313, 315, and 317. The range information of the synthesis region may be set to a range of each synthesis region 301, 303, 305, and 307.

Accordingly, the processor 170 may generate the synthesis regions 301, 303, 305, and 307 from the images obtained from the first to fourth cameras 160a, 160b, 160c, and 160d on the basis of the range information and the boundary information of the synthesis information to synthesize the synthesis regions 301, 303, 305, and 307, thereby generating the around view image.

As described above, the generated around view image may be displayed on the display 180 as it is in a normal mode.

Specifically, the processor 170 may extract images corresponding to the boundary lines 311, 313, 315, and 317 from the images acquired from the first to fourth cameras 160a, 160b, 160c, and 160d on the basis of the range information and the boundary information of the synthesis regions set in the range information to generate the around view image including the first to fourth synthesis regions 301, 303, 305, and 307 on the basis of the extracted images.

As described above, the images acquired from the first to fourth cameras 160a, 160b, 160c, and 160d are different from the first to fourth synthesis regions 301, 303, 305, 307 from the images.

Figure 5:
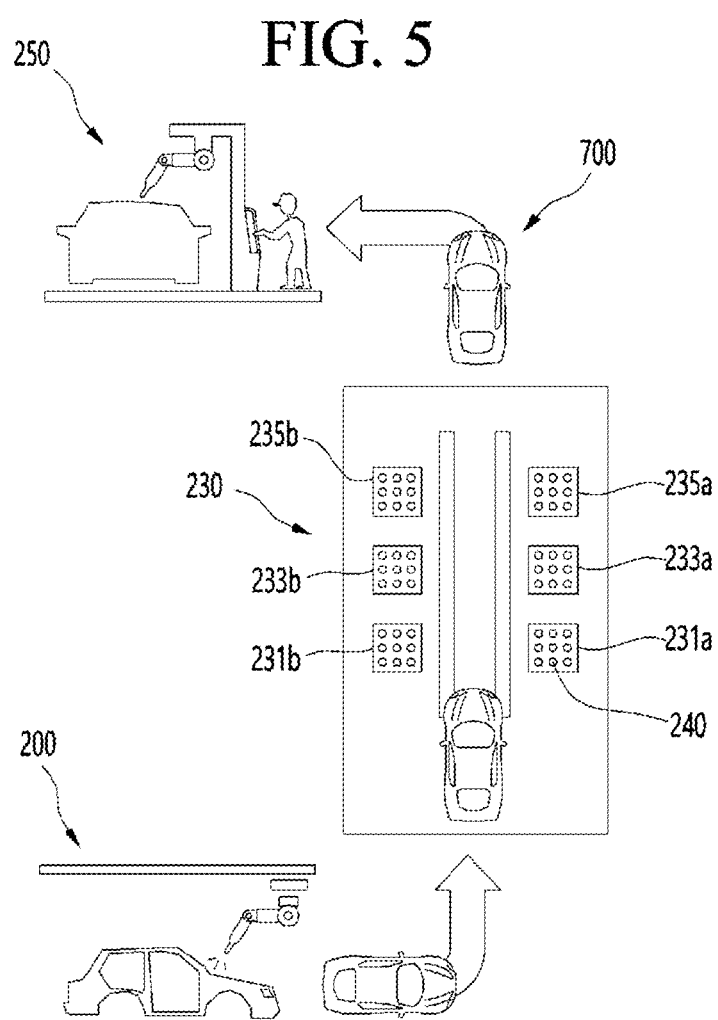
FIG. 5 is a view illustrating an overall workshop for correcting a camera according to an embodiment.

FIG. 5 is a view illustrating an overall workshop for correcting the camera according to an embodiment.

As illustrated in FIG. 5, the workshop may largely include an assembly facility 200, a camera correction field 230, and an inspection facility 250. The workshop may be, for example, a vehicle factory consumed by the vehicle manufacturer, but is not limited thereto.

The assembly facility 200 may be a place for assembling and manufacturing the vehicle 700. The inspection facility 250 may be a place for testing various performances of the vehicle 700 before shipping the manufactured vehicle 700. The camera correction field 230 may be a place where a camera correction method described later is performed. The camera correction field 230 may be disposed between the assembly facility 200 and the inspection facility.

In an embodiment, after the vehicle 700 is assembled in the assembly facility 200, the vehicle may pass through the camera correction field 230 before moving to the inspection facility 250.

Alternatively, the camera correction field 230 may be disposed in the next step of the inspection facility 250, but is not limited thereto.

Importantly, the correction of the cameras 160a, 160b, 160c, 160d according to an embodiment has to be performed before the vehicle 700 is shipped to the customer for delivery. Accordingly, the customer who has been delivered the vehicle 700 does not need to separately perform an operation for correcting the cameras 160a, 160b, 160c, and 160d, thereby greatly improving customer service satisfaction. In addition, since the cameras 160a, 160b, 160c, and 160d are corrected under the same environment in the standardized camera correction field 230 disposed in the vehicle manufacturer, a correction error may not occur between the vehicles, in which the cameras are corrected, in the vehicle manufacturer to minimize customer complaints.

A plurality of pattern members 231a, 231b, 233a, 233b, 235a, and 235b may be disposed on the camera correction field 230. For example, the pattern members 231a, 231b, 233a, 233b, 235a, and 235b may be provided as sheets and attached to the ground of the camera correction field 230. For example, the pattern members 231a, 231b, 233a, 233b, 235a, and 235b may be applied with color or painted on the ground of the camera correction field 230. Each pattern member 231a, 231b, 233a, 233b, 235a, and 235b may include a plurality of patterns 240. In FIG. 5, each of the pattern members 231a, 231b, 233a, 233b, 235a, and 235b has a square shape, and the pattern 240 is illustrated as having a circular shape, but is not limited thereto.

As another example, a pattern member which is elongated along both sides of the vehicle 700 may be provided in the driving direction of the vehicle 700. That is, the first pattern member is lengthily provided along the driving direction of the vehicle 700 from the left side of the vehicle 700, and the second pattern member is lengthily provided along the driving direction of the vehicle 700 from the right side of the vehicle 700.

The pattern members 231a, 231b, 233a, 233b, 235a, and 235b may be disposed on both sides of the camera correction field 230. The vehicle 700 may be driven in a linear direction between the pattern members 231a, 231b, 233a, 233b, 235a, and 235b disposed on both the sides. The camera correction field 230 may display at least one guideline by guiding the linear driving of the vehicle 700, but is not limited thereto. For example, first and second guidelines, each of which has a width greater than that of at least the vehicle 700, are displayed on the ground of the camera correction field 230 so that the vehicle 700 is linearly driven along to the first and second guidelines. The linear direction may be a direction parallel to the first and second guidelines displayed on the camera correction field 230.

The width of the camera correction field 230 may be greater than the sum of the width of the vehicle 700 and the width of each of the pattern members 231a, 231b, 233a, 233b, 235a, and 235b disposed at both the sides of the vehicle 700. The length of the camera correction field 230 may be minimized so that the vehicle 700 is driven to correct the cameras 160a, 160b, 160c, and 160d. For example, the length of the camera correction field 230 may be 5 m or more. Preferably, the length of the camera correction field 230 may be, for example, 6 m to 10 m.

While entering into one side of the camera correction field 230, for example, after being driven along the first and second guidelines and then exiting to the other side of the camera correction field 230, the cameras 160a, 160b, 160c, 160d in the vehicle 700 may be corrected. Specifically, the correction of the cameras 160a, 160b, 160c, and 160d may be performed in the around view system 100 mounted on the vehicle 700. More specifically, the correction of the cameras 160a, 160b, 160c, and 160d may be performed in the processor included in the around view system.

Hereinafter, a method for performing camera correction in a workplace for correction of the cameras 160a, 160b, 160c, and 160d, specifically, the camera correction field 230 will be described in detail.

Figure 6:
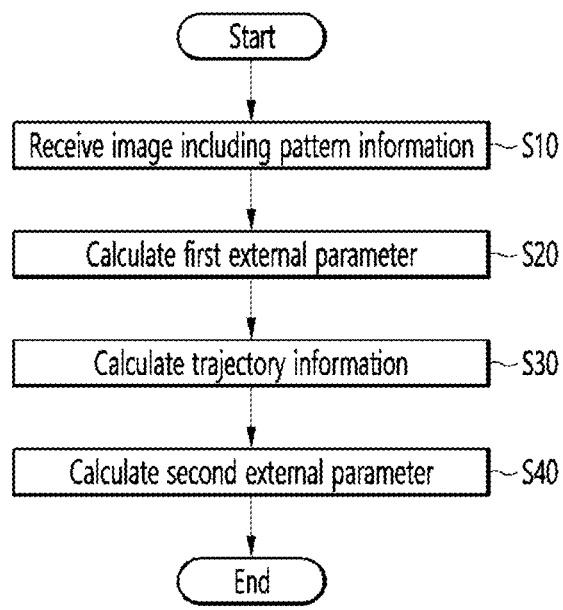
FIG. 6 is a flowchart illustrating a method for correcting a camera according to an embodiment.
Figure 7:
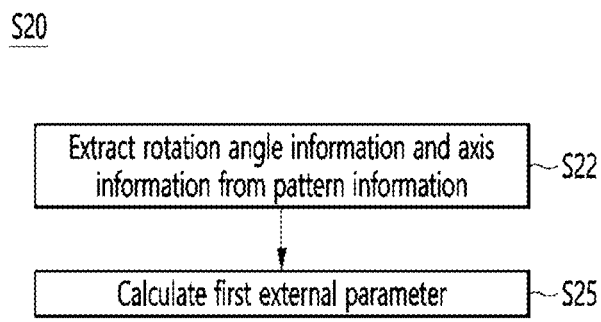
FIG. 7 is a flowchart for explaining operation S20 of FIG. 6 in detail.
Figure 8:
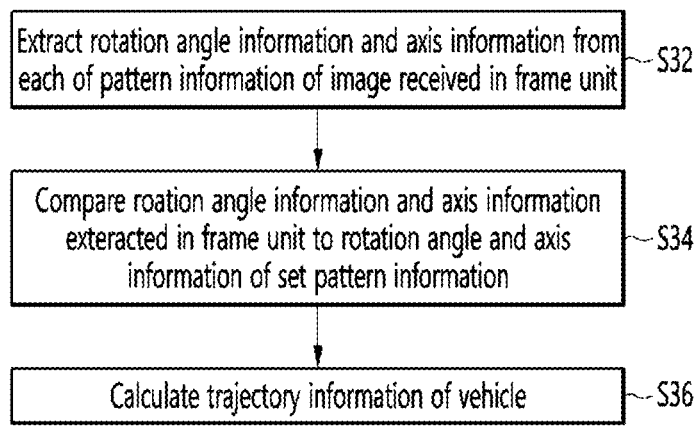
FIG. 8 is a flowchart for explaining operation S30 of FIG. 6 in detail.
Figure 9:
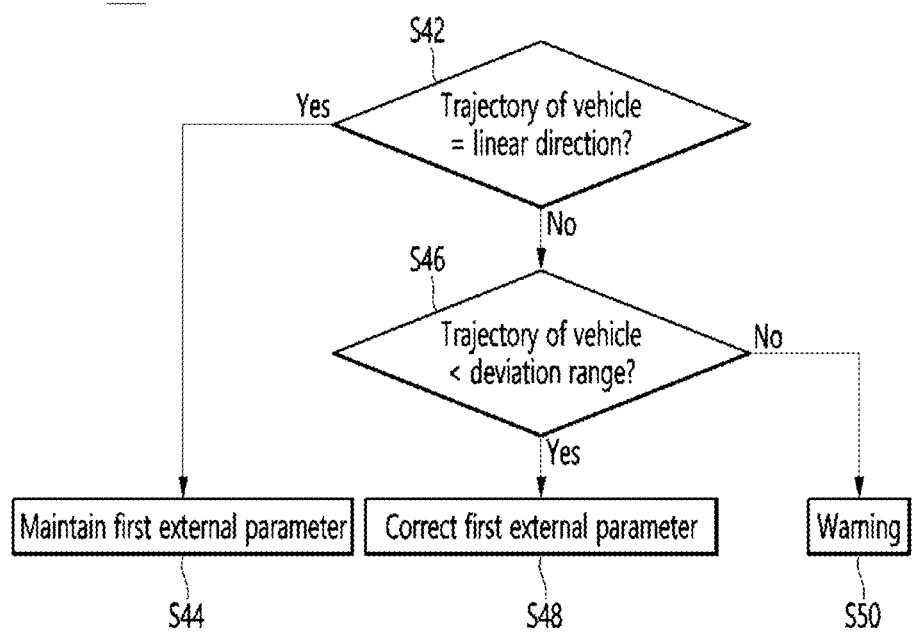
FIG. 9 is a flowchart for explaining operation S40 of FIG. 6 in detail.

FIG. 6 is a flowchart illustrating a method for correcting a camera according to an embodiment, FIG. 7 is a flowchart for explaining operation S20 of FIG. 6 in detail, FIG. 8 is a flowchart for explaining operation S30 of FIG. 6 in detail, and FIG. 9 is a flowchart for explaining operation S40 of FIG. 6 in detail.

Referring to FIGS. 1 to 6, the processor 170 of the around view system 100 may receive images including pattern information acquired by each of a plurality of cameras 160a, 160b, 160c, and 160d of the vehicle 700 being driven (S10).

The cameras 160a, 160b, 160c, and 160d may be mounted along a circumference of the vehicle 700. For example, the cameras 160a, 160b, 160c, and 160d may be mounted on front, rear, left, and right sides of the vehicle 700. For example, the first camera 160a may be mounted at the front side of the vehicle 700, for example, near the emblem or near the radiator grille, to acquire a front image by capturing a front side in the driving direction. For example, the second camera 160b may be mounted in the case surrounding the right side mirror to acquire a right image by capturing a subject in the right direction. For example, the third camera 160c may be mounted at the rear side of the vehicle 700, for example, near the rear license plate or the trunk switch to capture a rear side of the driving direction, thereby acquiring a rear image. For example, the fourth camera 160d may be mounted in the case surrounding the left side mirror to acquire a left image by capturing the subject in the right direction. Furthermore, additional cameras may be further installed in addition to the first to fourth cameras 160a, 160b, 160c, and 160d as necessary.

For example, the driving of the vehicle 700 and the correction of the cameras 160a, 160b, 160c, and 160d may be interlocked with each other. That is, the correction operation of the cameras 160a, 160b, 160c, and 160d may be performed simultaneously with the driving of the vehicle 700. As an example, when the driving of the vehicle 700 is detected by the driving sensing unit (not shown), the sensing signal may be transmitted to the processor 170. The processor 170 may activate a correction function of the cameras 160a, 160b, 160c, and 160d in response to the detection signal. Thus, power is supplied to the plurality of cameras 160a, 160b, 160c, and 160d mounted around the vehicle 700 to acquire corresponding images from the cameras 160a, 160b, 160c, and 160d.

Specifically, when the vehicle 700 enters into one side of the camera correction field 230 to start the driving, the correction function of the cameras 160a, 160b, 160c, and 160d may be activated. Thus, it is possible to acquire an image of an object including the pattern members 231a, 231b, 233a, 233b, 235a, and 235b disposed on both the sides of the vehicle 700 from the camera 160a, 160b, 160c, and 160d. The pattern members 231a, 231b, 233a, 233b, 235a, and 235b may be recognized as pattern information by the processor 170. For example, when each of the cameras 160a, 160b, 160c, and 160d transmits the image of the object including the pattern members 231a, 231b, 233a, 233b, 235a, and 235b to the processor 170, the processor 170 may recognize the pattern members 231a, 231b, 233a, 233b, 235a, and 235b from the image as the pattern information. That is, the pattern information may be extracted from the pattern members 231a, 231b, 233a, 233b, 235a, and 235b included in the image. As another example, each of the cameras 160a, 160b, 160c, and 160d may generate the pattern information corresponding to each of the pattern members 231a, 231b, 233a, 233b, 235a, and 235b from the acquired image to transmit the image including the pattern information to the processor 170.

The pattern information may include three rotation angle information (roll, pitch, and yaw) and three axis information (X, Y, and Z). For example, the roll may be defined as an angle rotating about the X axis, the pitch may be defined as an angle rotating about the Y axis, and the yaw may be defined as an angle rotating about the Z axis. For example, the X axis may be a front-rear direction of the vehicle 700, the Y axis may be a left-right direction of the vehicle 700, and the Z axis may be a vertical direction of the vehicle 700.

The processor 170 may calculate a first parameter based on the pattern information of the received image (S20). For example, the first parameter may be calculated based on the rotation angle information and the axis information of the pattern information.

Specifically, as described above, the pattern information may include the three rotation angle information (roll, pitch, and yaw) and the three axis information (X, Y, and Z). As shown in FIG. 7, the processor 170 may extract the rotation angle information and the axis information from the pattern information (S22). Coordinate information of the pattern members 231a, 231b, 233a, 233b, 235a, and 235b may be grasped, for example, by the axis information. Twist information of the pattern members 231a, 231b, 233a, 233b, 235a, and 235b may be grasped, for example, by the rotation angle information. For example, when the ground of the camera correction field 230 is maintained as a horizontal plane, and the vehicle 700 is driven in the linear direction, all of the roll value, the pitch value, and the yaw value may be zero. As another example, when the ground of the camera correction field 230 is maintained in the horizontal plane, and the vehicle 700 is driven away from the linear direction, the roll value or the pitch value may be zero, but the yaw value may exist. The yaw value may also increase as a deviation width of the vehicle 700m which is deviated from the linear direction increases. The linear direction may be a direction parallel to the first and second guidelines displayed on the camera correction field 230.

The processor 170 may calculate a first external parameter based on the extracted rotation angle information and the axis information (S25).

Typically, the external parameter may be a parameter, which describes a transformation relationship between the coordinate systems of the cameras 160a, 160b, 160c, and 160d and the world coordinate system, and may be expressed by rotation and translation transformation between the two coordinate systems. Since the external parameter is not unique to the cameras 160a, 160b, 160c, and 160d, the external parameter may be changed depending on installed directions of the cameras 160a, 160b, 160c, 160d and also changed depending on how the world coordinate system is defined. Since a technique for calculating the parameter using the rotation angle information and the axis information has been widely known, their detailed descriptions will be omitted.

Referring again to FIG. 6, the processor 170 may calculate trajectory information of the vehicle 700 based on the pattern information of the image received in a frame unit (S30).

The trajectory information of the vehicle 700 may not be calculated from pattern information of an image obtained in one frame. That is, the trajectory information of the vehicle 700 may be calculated from pattern information of an image obtained in at least two or more frame units.

As illustrated in FIG. 8, for this, the processor 170 may extract the rotation angle information and the axis information from each of the pattern information of the image received in the frame unit (S32). For example, the cameras 160a, 160b, 160c, and 160d may capture the pattern members 231a, 231b, 233a, 233b, 235a, and 235b of the camera correction field 230 in a unit of 16.67 ms, but are not limited thereto. In this case, the frame unit may be 16.67 ms. That is, the cameras 160a, 160b, 160c, and 160d may acquire images by capturing the pattern members 231a, 231b, 233a, 233b, 235a, and 235b for each unit of 16.67 ms.

When each of the cameras 160a, 160b, 160c, and 160d is driven, an image including the pattern information may be obtained from each camera 160a, 160b, 160c, 160d in the frame unit. The image including the obtained frame unit-based pattern information may be transferred to the processor 170. The processor 170 may extract the rotation angle information and the axis information from each of the pattern information included in the frame unit-based image transmitted as described above.

The processor 170 may compare the rotation angle information and the axis information extracted in the frame unit to the rotation angle information and the axis information of the set pattern information (S34).

The set pattern information may be acquired and set when the vehicle 700 is driven in the linear direction between the plurality of pattern members 231a, 231b, 233a, 233b, 235a, and 235b placed on the ground around the vehicle 700. The set pattern information may be set in the memory 140 of the around view system 100 by the vehicle 700 before the vehicle 700 is driven, for example, when the vehicle 700, that is, the around view system, is mounted in the assembly facility 200. The set pattern information may be obtained through a plurality of driving tests in the linear direction. The set pattern information may be set identically for each vehicle 700 assembled in the assembly facility 200. The linear direction may be a direction parallel to the first and second guidelines displayed on the camera correction field 230.

The set pattern information may include three rotation angle information (roll, pitch, and yaw) and three axis information (X, Y, and Z). The three rotation angle information and axis information of the set pattern information may be set in a frame unit. Thus, the rotation angle information and the axis information of the set pattern information may be set in the frame unit, and the rotation angle information and the axis information of the pattern information that are actually obtained while driving the vehicle 700 may be one-to-one compared to each other.

For example, the rotation angle information of the pattern information acquired for the first frame and the rotation angle information of the set pattern information set for the first frame are compared to each other, and the axis information of the pattern information acquired during the first frame and the set pattern information that is set for the first frame may be compared to each other.

Subsequently, the rotation angle information of the pattern information acquired for the second frame and the rotation angle information of the set pattern information set for the second frame are compared to each other, and the axis information of the pattern information acquired during the second frame and the set pattern information that is set for the second frame may be compared to each other.

In this manner, the rotation angle information of the pattern information and the rotation angle information of the set pattern information, which are acquired in the frame unit, may be compared to each other, and the axis information of the pattern information and the axis information of the set pattern information may be compared to each other.

The processor 170 may calculate the trajectory information of the vehicle 700 through the comparison (S36). That is, the processor 170 may calculate the trajectory information of the vehicle 700 based on the difference between the rotation angle information and the axis information, which are extracted in the frame unit and the rotation angle information and the axis information of a predetermined pattern information.

When the difference between the rotation angle information and the axis information, which are extracted in the frame unit, and the rotation angle information and the axis information of the predetermined pattern information occurs, it may mean that the vehicle 700 is not driven in the linear direction but is deviated from the linear direction. For example, if the difference between the rotation angle information and axis information, which are extracted in the frame unit, and the rotation angle information and the axis information of the predetermined pattern information increases as the vehicle 700 continues to be driven, the width of the vehicle 700 deviated from the linear direction may increase.

Thus, the trajectory of the vehicle 700 may be tracked by comparing the pattern information acquired from the cameras 160a, 160b, 160c, and 160d in the frame unit and the predetermined pattern information.

The trajectory information of the vehicle 700 may include the deviation width information in the frame unit, but is not limited thereto. Referring again to FIG. 6, the processor 170 may correct the first parameter based on the trajectory information of the vehicle 700 to calculate the second parameter (S40).

Referring again to FIG. 6, the first parameter may be corrected in the frame unit.

As another example, the first parameter may be corrected in a unit of a certain section including a plurality of frames. As described above, as the first parameter is corrected in the unit of the certain section, a load due to the correction of the cameras 160a, 160b, 160c, and 160d may be reduced.

When the vehicle 700 is deviated from the linear direction while being driven, the deviation width may be reflected in the first parameter to calculate the second parameter.

As illustrated in FIG. 9, the processor 170 may determine whether the trajectory of the vehicle 700 matches the linear direction (S42).

When the trajectory of the vehicle 700 matches the linear direction, the first parameter may not need to be corrected because the vehicle 700 is not deviated from a predetermined trajectory. That is, the first parameter may be maintained as it is as the value calculated in the previous frame (S44).

When the trajectory of the vehicle 700 does not match the linear direction, the processor 170 may determine whether the trajectory of the vehicle 700 is within a set deviation range (S46). The set deviation range may be a maximum deviation range in which the correction of the cameras 160*a*, 160*b*, 160*c*, and 160*d* is enabled. Accordingly, when the trajectory of the vehicle 700 is out of the maximum deviation range, the processor 170 may output a warning through voice or a screen (S50).

When the trajectory of the vehicle 700 is within the predetermined deviation range, the processor 170 may calculate the second parameter by correcting the first parameter (S48).

The second parameter may be corrected differently according to the deviation range in which the trajectory of the vehicle 700 is deviated from the linear direction.

The more the deviation range in which the trajectory of the vehicle 700 is deviated from the linear direction increases, the more the correction width of the second parameter increases.

The around view image may be generated or updated using the second parameters calculated by correcting the first parameter to remove mismatch in the boundary surface between the adjacent images acquired from each camera 160*a*, 160*b*, 160*c*, and 160*d*. Therefore, the around view image displayed on the screen may not be disturbed to the driver, and thus, the customer satisfaction may be improved.

The detailed description is intended to be illustrative, but not limiting in all aspects. It is intended that the scope according to the embodiment should be determined by the rational interpretation of the claims as set forth, and the modifications and variations according to the embodiment come within the scope of the appended claims and their equivalents.

INDUSTRIAL APPLICABILITY

The embodiment may be applied to a movable body. An example of the movable body includes the vehicle or the like.

The invention claimed is:

1. A method for correcting a plurality of cameras by using a plurality of pattern members, the method comprising:
receiving pattern information of the plurality of pattern members by using the plurality of cameras disposed on a circumference of a vehicle being driven, wherein each pattern member of the plurality of pattern members is disposed on a ground on which the vehicle is being driven, and wherein the pattern information is information of only the plurality of pattern members disposed on the ground;
calculating a first parameter based on the received pattern information;
calculating trajectory information of the vehicle based on a difference in extracted rotation angle information and axis information of the pattern information and rotation angle information and axis information of set pattern information; and
calculating a second parameter by correcting the first parameter based on the trajectory information of the vehicle.

2. The method according to claim 1, wherein the calculating of the first parameter comprises:
extracting the rotation angle information and axis information from the pattern information; and
calculating the first parameter based on the extracted rotation angle information and axis information.

3. The method according to claim 1, wherein each pattern member of the plurality of pattern members comprises a plurality of circular shapes.

4. The method according to claim 3, wherein each pattern member of the plurality of pattern members comprises a square shape having the plurality of circular shapes disposed therein.

5. A method for correcting a plurality of cameras by using a plurality of pattern members, the method comprising:
receiving pattern information of the plurality of pattern members by using the plurality of cameras disposed on a circumference of a vehicle being driven;
calculating a first parameter based on the received pattern information;
calculating trajectory information of the vehicle by using the pattern information; and
calculating a second parameter by correcting the first parameter based on the trajectory information of the vehicle,
wherein the calculating of the first parameter comprises:
extracting rotation angle information and axis information from the pattern information; and
calculating the first parameter based on the extracted rotation angle information and axis information, and
wherein the calculating of the trajectory information of the vehicle comprises:
extracting the rotation angle information and axis information from the pattern information;
comparing the rotation angle information and axis information to rotation angle information and axis information of set pattern information; and
calculating the trajectory information of the vehicle based on a difference in the extracted rotation angle information and axis information and the rotation angle information and axis information of the set pattern information.

6. The method according to claim 5, wherein the set pattern information is acquired and set when the vehicle is driven in a linear direction between the plurality of pattern members disposed around the circumference of the vehicle on a ground on which the vehicle is driving.

7. The method according to claim 5, wherein the comparison comprises:
comparing the rotation angle information to the rotation angle of the set pattern information; and
comparing the axis information to the axis information of the set pattern information.

8. The method according to claim 5, wherein the calculating of the second parameter comprises:
determining whether the trajectory of the vehicle matches the linear direction; and
calculating the second parameter by correcting the first parameter when the trajectory of the vehicle does not match the linear direction.

9. The method according to claim 8, wherein the calculated second parameter is differently corrected depending on a deviation range in which the trajectory of the vehicle is deviated from the linear direction.

10. The method according to claim 9, wherein, as the deviation range increases, a correcting width of the second parameter increases.

11. A device for correcting a plurality of cameras, comprising:
the plurality of cameras disposed on a circumference of a vehicle; and
a processor,
wherein the processor is configured to:

receive pattern information of a plurality of pattern members, which are acquired by the plurality of cameras while the vehicle is being driven along a ground, wherein each pattern member of the plurality of pattern members is disposed on the ground, and wherein the pattern information is information of only the plurality of pattern members disposed on the ground;

calculate a first parameter based on a difference in extracted rotation angle information and axis information of the pattern information and rotation angle information and axis information of set pattern information;

calculate trajectory information of the vehicle based on the pattern information; and calculate a second parameter by correcting the first parameter based on the trajectory information of the vehicle.

12. The device according to claim 11, wherein the calculating of the trajectory information of the vehicle comprises:
extracting the rotation angle information and axis information from the pattern information; and
comparing the rotation angle information and axis information to the rotation angle information and axis information of set pattern information to obtain the difference in the extracted rotation angle information and axis information of the pattern information and the rotation angle information and axis information of the set pattern information.

13. The device according to claim 11, wherein each pattern member of the plurality of pattern members comprises a plurality of circular shapes.

14. The device according to claim 13, wherein each pattern member of the plurality of pattern members comprises a square shape having the plurality of circular shapes disposed therein.

* * * * *